US006965770B2

(12) United States Patent
Walsh et al.

(10) Patent No.: US 6,965,770 B2
(45) Date of Patent: Nov. 15, 2005

(54) DYNAMIC CONTENT DELIVERY RESPONSIVE TO USER REQUESTS

(75) Inventors: Rod Walsh, Tampere (FI); Juha Häkkinen, Tampere (FI); Matti Hämäläinen, Lempäälä (FI); Mauri Väänänen, Tampere (FI); Ari Tähti, Vantaa (FI); Kristiina Nevakivi, Espoo (FI)

(73) Assignee: Nokia Corporation, (FI)

( * ) Notice: Subject to any disclaimer, the term of this patent is extended or adjusted under 35 U.S.C. 154(b) by 605 days.

(21) Appl. No.: 09/950,577

(22) Filed: Sep. 13, 2001

(65) Prior Publication Data

US 2003/0050058 A1 Mar. 13, 2003

(51) Int. Cl.[7] .............................................. H04Q 7/20
(52) U.S. Cl. ............................. 455/426.1; 455/414.1; 455/3.04; 455/3.06; 455/41.2; 709/201; 709/206; 709/219; 709/229; 370/259; 370/351; 370/352
(58) Field of Search ........................ 455/426.1, 36.04, 455/3.06, 414.1; 709/201, 206, 203, 219, 709/229; 370/259, 351, 352

(56) References Cited

U.S. PATENT DOCUMENTS

| 5,572,442 | A | | 11/1996 | Schulhof et al. |
| 5,917,480 | A | | 6/1999 | Tafoya et al. |
| 5,920,311 | A | | 7/1999 | Anthias |
| 5,977,983 | A | | 11/1999 | Einkauf et al. |
| 6,052,676 | A | | 4/2000 | Hekmatpour |
| 6,098,126 | A | | 8/2000 | Batson et al. |
| 6,173,310 | B1 | * | 1/2001 | Yost et al. .................... 709/201 |
| 6,185,625 | B1 | * | 2/2001 | Tso et al. .................... 709/247 |
| 6,199,076 | B1 | * | 3/2001 | Logan et al. ............. 715/501.1 |
| 6,219,054 | B1 | * | 4/2001 | Komoda et al. ............. 345/841 |
| 6,243,443 | B1 | * | 6/2001 | Low et al. ............... 379/88.17 |
| 6,248,946 | B1 | * | 6/2001 | Dwek ........................... 84/609 |
| 6,317,761 | B1 | | 11/2001 | Landsman et al. |
| 6,324,182 | B1 | | 11/2001 | Burns et al. |
| 6,336,137 | B1 | * | 1/2002 | Lee et al. .................... 709/219 |
| 6,393,158 | B1 | | 5/2002 | Gould et al. |
| 6,397,259 | B1 | | 5/2002 | Lincke et al. |
| 6,411,616 | B1 | * | 6/2002 | Donahue et al. ............ 370/352 |
| 6,507,727 | B1 | | 1/2003 | Henrick |
| 6,671,732 | B1 | * | 12/2003 | Weiner ....................... 709/231 |
| 6,708,200 | B1 | * | 3/2004 | Ura et al. .................... 709/203 |
| 6,721,288 | B1 | * | 4/2004 | King et al. .................. 370/310 |
| 6,769,009 | B1 | * | 7/2004 | Reisman ...................... 709/201 |

(Continued)

OTHER PUBLICATIONS

The hard reality behind 3G services, http://dailynews.yahoo.com/h/zd/2001070 . . . hard reality behind 3g services 1.ht 3 pages , dated Jul. 9, 2001.

(Continued)

*Primary Examiner*—Marceau Milord
(74) *Attorney, Agent, or Firm*—Banner & Witcoff, Ltd.

(57) ABSTRACT

A method and system for establishing a dynamic content delivery system (DCDS) is disclosed. In one embodiment, a Bluetooth enabled mobile communications unit is used to communicate with a server in order to make a request for the delivery of specific content, such as a song, video, or the like, to a separate output device, such as a loudspeaker, a display screen, or the like. In another embodiment the content is delivered back to the requesting mobile communications device. In some embodiments, hybrid networks may be used for requesting and delivering content. A narrowband, bi-directional, unicast network may be used for requesting content and acknowledging the requests, while a broadband, unidirectional, multicast network may be used to deliver the requested content to the requesting client device. The order in which the content is delivered may be modified by user requests according to a predetermined algorithm.

82 Claims, 9 Drawing Sheets

U.S. PATENT DOCUMENTS 6,834,308 B1 * 12/2004 Ikezoye et al. .............. 709/231

OTHER PUBLICATIONS

G. Faria, "Mobile DVB-T Using Antenna Receivers", 7 pages, printed Jul. 11, 2001.

G. Faria, "MCP Report to 42° TM", 12 pages, printed Jul. 11, 2001.

M. Lipsanen, "Interactivity with GSM in a Portable Terminal", Nokia Home Communications, 14 pates, dated Oct. 25, 2000, Downloaded and printed from DVB.org website on Jul. 11, 2001.

* cited by examiner

DYNAMIC CONTENT DELIVERY RESPONSIVE TO USER REQUESTS

FIELD OF THE INVENTION

The invention relates to wireless communications. More specifically, the invention relates to a method and system for requesting media content over one network, and delivering media content over another network.

BACKGROUND OF THE INVENTION

Personal computer and mobile communications use has steadily increased in recent years, motivated in part by the birth of the Internet. The combination of mobile communications and the Internet makes possible a new set of communications tools and can expand the media, services and manufacturing industries that have contributed to the growth of personal communications.

The next wave of mobile technology, 3G (Third Generation cellular) devices, will be capable of telephony, Internet access, PC-like applications and video streaming, among others. Many of these devices will be enabled with Bluetooth capabilities. Bluetooth is a low power, short range radio technology that may be used to connect one device to another. Bluetooth was developed to standardize wireless communications between devices, removing the need for physical wires to make a connection between devices.

Known in the art is the concept of streaming media across networks such as the Internet. Examples include streaming audio and video from a single server to multiple users, such as is performed by Internet radio stations, content providers such as BMWfilms.com, and news services such as CNN.com. Streaming audio and video may be viewed on a computer using a media player such as Real Networks' REAL PLAYER®.

However, a radio station's broadcast over the Internet cannot be automatically altered by listeners. If a listener desires to hear a specific song, the listener must telephone the radio station and verbally request the song to a radio station employee. The radio station, at its own discretion, may then decide to alter its programming based on the user's request. Because streamed media may be received anywhere in the world, it is often difficult and expensive for an Internet listener to telephone a radio station that is located far away.

A known system for altering a musical performance is the use of a jukebox. Using a jukebox, optionally attached to a facility's audio system, listeners can request music to be played (often for a fee). However, in order to use a jukebox, the listener must physically move to the jukebox's location in order to request a song. In addition, jukeboxes tend to be bulky and take up often limited space in a retail establishment.

One known solution to these space limitations is the use of remote, or mini, jukeboxes at each table in a restaurant. Each table is equipped with a mini-jukebox through which the listener can request a song to be played over a master audio system. The songs are not actually stored in the jukeboxes at each table. Instead, the mini-jukebox at each table is merely an interface through which the user can request music. The requested songs are placed in a queue and then played back in the order of their request.

However, these mini-jukebox systems require a separate interface for each table, and are expensive to install. Additionally, the user must still be physically located at a table equipped with one of the interface jukeboxes in order to request a song. Also, using either a traditional jukebox or a mini-jukebox system, it is not possible for a listener to sample a song before requesting it. If a user does not know or does not remember the name of the song he or she wants to hear, the user must guess which song to request.

It would be an advancement in the art to develop a content delivery system that did not require the overhead associated with traditional jukebox systems. In addition, it would be an advancement in the art to develop a content delivery system that did not require a listener to be at the physical location of a music storage system in order to request a song or video to be performed, and also allowed the listener to sample a song before submitting a request for that particular song. Thus, there is a need for a dynamic content delivery service to compensate for the above recited shortcomings.

BRIEF SUMMARY OF THE INVENTION

In a first aspect of the invention, there is a method for delivering content. A content server sends a list of selectable content items to a mobile terminal. The content server receives a request from the mobile terminal, wherein the request corresponds to a user-selected content item from the list of selectable content items. Responsive to receiving the request, the content server plays a first content item through an output device.

In a second aspect of the invention, there is a content server for delivering content. The content server includes a processor and memory for storing computer readable instructions that, when executed by the processor, cause the content server to perform the steps of sending a list of selectable content items to a mobile terminal, receiving a request from the mobile terminal, wherein the request corresponds to a user-selected content item from the list of selectable content items, and responsive to receiving the request, playing a first content item through an output device.

In a third aspect of the invention, there is a computer readable medium storing computer readable instructions that, when executed by a processor, cause a data processing device to provide content delivery services by performing the steps of a content server sending a list of selectable content items to a mobile terminal, receiving a request from a mobile terminal, wherein the request corresponds to a user-selected content item from the list of selectable content items, and, responsive to receiving the request, the content server playing a first content item through an output device.

In another aspect of the invention, there is a content delivery system that includes a loudspeaker, a short-range transceiver, and a content server communicatively coupled to the loudspeaker and to the transceiver. The content server includes a processor and memory storing computer readable instructions that, when executed by the processor, cause the content server to perform a set of steps. The content server sends a list of selectable musical compositions to a mobile terminal through the transceiver. The content server receives a request from the mobile terminal through the transceiver, wherein the request corresponds to a user-selected musical composition from the list of selectable musical compositions. Responsive to receiving the request, the content server modifies a playlist according to a predetermined algorithm, and plays a first musical composition from the playlist through the loudspeaker.

In some embodiments, the loudspeaker and the transceiver are located within a commercial establishment, such as a restaurant.

In another aspect of the invention, there is a content server that includes a processor, and memory for storing computer readable instructions that, when executed by the processor, cause the content server to perform the steps of wirelessly receiving a request from a mobile terminal over a narrowband, bi-directional network, wherein the request corresponds to a user-selected content item and, responsive to receiving the request, modifying a playlist according to a predetermined algorithm. The content server outputs a first content item from the playlist over a broadband, unidirectional network for playback using an output device.

In some embodiments, the narrowband network is a GPRS network and the broadband network is a DVB-T network.

In another aspect of the invention, there is a mobile terminal that includes a processor, a display screen, a plurality of user input buttons, and memory storing computer readable instructions that, when executed by the processor, cause the mobile terminal to perform a set of steps. The mobile terminal displays a list of user-selectable content items on the display screen. The terminal navigates the list of user-selectable content items responsive to user-input through the user input buttons, and receives input indicating a user-selected content item. The mobile terminal sends information corresponding to the user-selected content item to a content server for playback through an output device.

In some embodiments, the mobile terminal plays a sample of a current item on an output device on the mobile terminal before the user selects a content item.

BRIEF DESCRIPTION OF THE DRAWINGS

A more complete understanding of the present invention and the advantages thereof may be acquired by referring to the following description in consideration of the accompanying drawings, in which like reference numbers indicate like features and wherein.

DETAILED DESCRIPTION OF THE INVENTION

A dynamic content delivery system (DCDS) may be used to deliver user-selected songs over an audio system. A DCDS is a system that receives requests from users for specific content to be delivered, and delivers the requested content over the same or a different network. The content may be audio recordings (e.g., songs, musical compositions, sound effects, or other audio content), video recordings (e.g., television programs, music videos, movies, or other video content), or other content suitable for delivery over a network (e.g., stock tickers, news headlines, sports games' scores, etc.). While it should be appreciated by those skilled in the art that a DCDS may be used to deliver both audio and video content, for exemplary purposes the invention is described herein using a DCDS that primarily delivers audio content.

Figure 1:
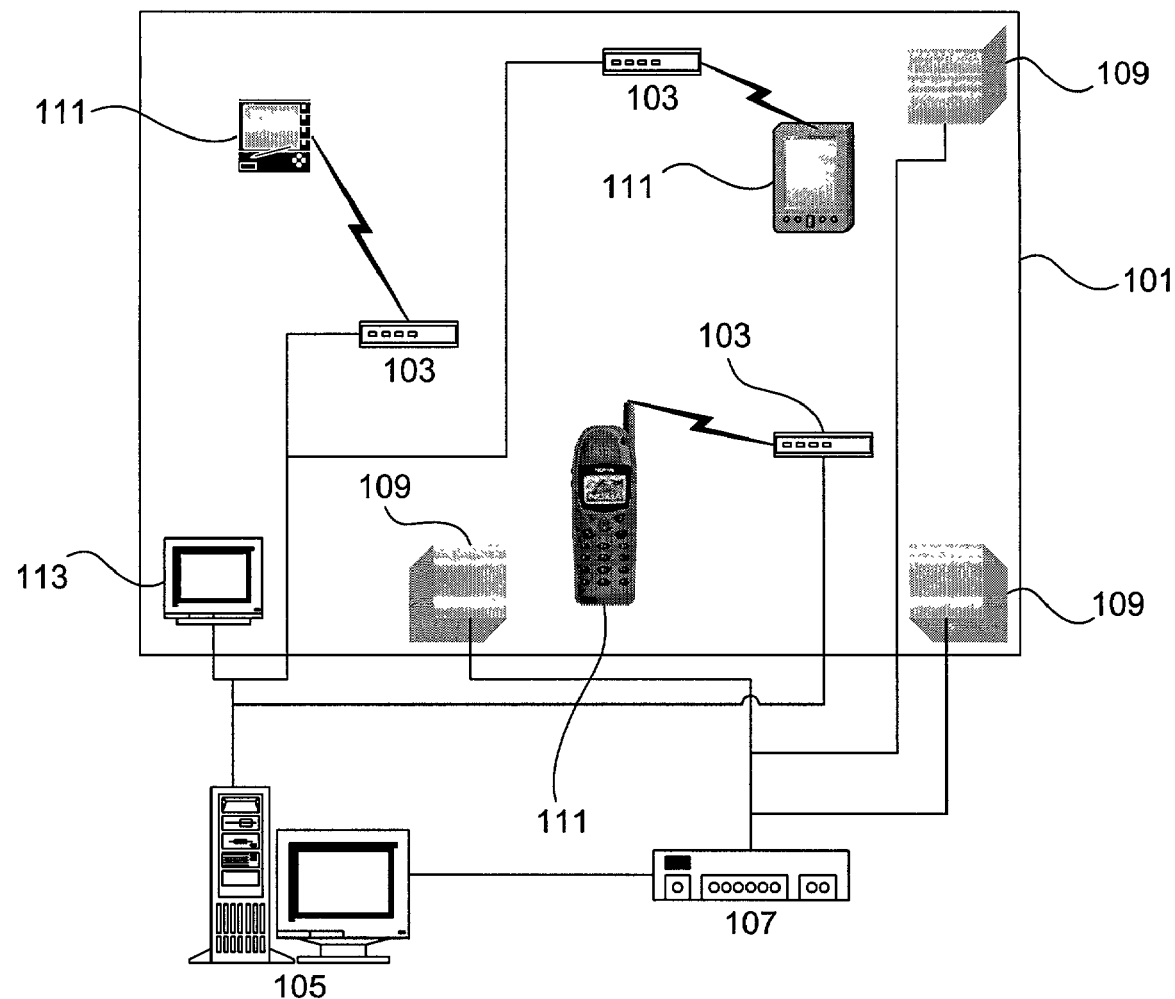
FIG. 1 illustrates a dynamic content delivery system according to an embodiment of the invention.

FIG. 1 illustrates one embodiment of the invention where Bluetooth (BT) radio technology is used in the DCDS to allow users to request audio content using each user's individual Bluetooth-enabled mobile communications device. However, the invention is not limited to Bluetooth devices. For instance, HomeRF, WLAN, cellular telephone networks, or HyperLAN2 may be used as well. In FIG. 1, there is a location 101 that provides the DCDS for use by users (listeners). The location 101 may be a commercial establishment, such as a restaurant or pub, a store, or the like, or it may be any other location in which music is played. For purposes of illustration only, location 101 is referred to herein as a restaurant.

Within restaurant 101 is located one or more Bluetooth transceivers 103. The Bluetooth transceivers 103 are used to communicate with Bluetooth enabled devices 111. Each Bluetooth device may be a mobile telephone, personal digital assistant (PDA), mobile or laptop computer, tablet computer, or any other data processing device that is Bluetooth-enabled and, optionally, able to playback audio output. For purposes of illustration, a Bluetooth-enabled mobile telephone is used, and is referred to as a Bluetooth client. The Bluetooth transceivers 103 are connected to a DCDS server 105. The DCDS server 105 receives the user requests from the Bluetooth transceivers, determines which audio recording to play by maintaining a song playlist, and outputs audio recordings through amplifier 107 to speakers 109. An optional monitor or television display 113 may be installed in the restaurant to inform users of their requests' status, current playing song, and other information described below, or to deliver audiovisual content. Alternatively, each Bluetooth client may be equipped with a video display. In this case, video content and information may be sent and played back on the Bluetooth client device.

Figure 17:
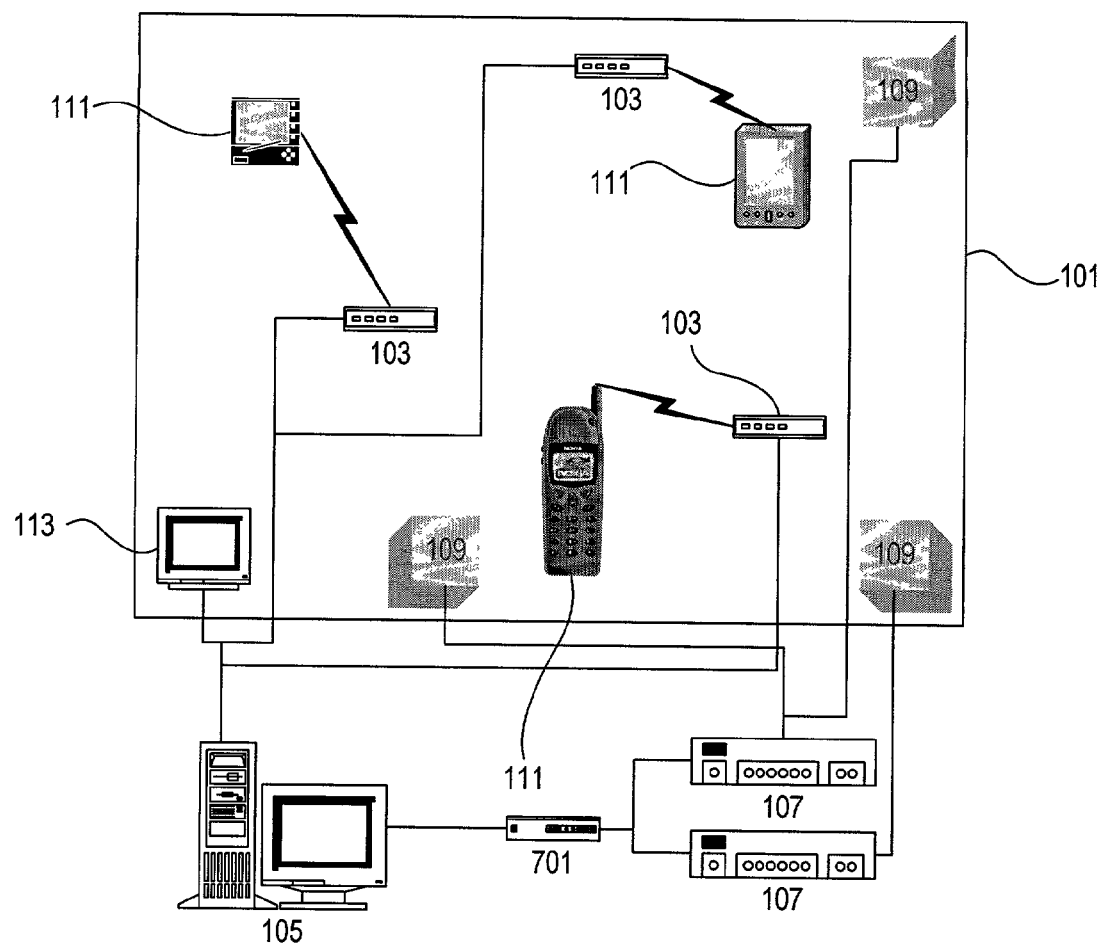
FIG. 17 illustrates a dynamic content delivery system according to an embodiment of the invention.

In another embodiment of the invention, shown in FIG. 17, an external digital to analog converter 701 may be used in order to minimize computer-based disturbance during output. FIG. 17 also illustrates that multiple amplifiers may be used, depending on user and system requirements.

Figure 2:
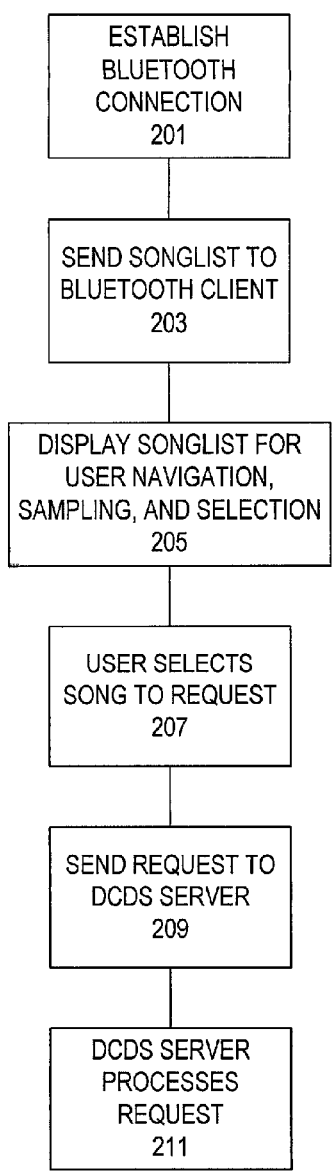
FIG. 2 illustrates a flowchart of a method for performing dynamic content delivery.

With reference to FIGS. 1 and 2, a method for performing content selection will now be described. When a user enters the restaurant 101, a connection between the user's mobile telephone 111 and the DCDS is established, in step 201, through one or more of the Bluetooth transceivers 103. After the Bluetooth connection is established, the DCDS sends a songlist to the Bluetooth client 111 in step 203. In one embodiment this is performed by sending a plugin program to the Bluetooth client 111. The selection program may run on the DCDS server 105, sending the output (the songlist or portion of the songlist to display and optionally song samples) to the mobile telephone. The plugin program interprets the received data and displays it on the mobile telephone's display screen.

In step 205, the user may navigate the songlist using known navigational techniques on the mobile telephone (e.g., up and down arrow keys, and enter and cancel keys). The user is shown song names or categories from which he or she may choose. Optionally, the user may listen to samples of the listen songs using the speaker on the Bluetooth client 111. For instance, by holding the Bluetooth client in front of his or her eyes and navigating using the up and down buttons, a user may listen to the available songs through the speaker as they are highlighted on the display screen. When each song is highlighted, the name of the song is shown on the display screen. However, because the user can also listen to the available music, he or she does not need to look at the screen. When the user finds or hears a desired piece of music, the user may press the enter button and the song will be sent for playback in high quality level audio via stereo equipment 109, or by broadcasting, as described below. Bluetooth clients 111 that do not have a speaker obviously do not perform this option. Samples should be played from a recognizable portion of the selected song such that the user can easily determine whether or not to request the sampled song.

Songs may also be displayed on the mobile telephone 111 hierarchically. That is, the songs may be sorted by genre, artist, album, and title, or any subset or superset thereof. Other hierarchical identifiers may be used as is known in the art, and as is suitable to the type of content being delivered (e.g., audio, video, etc.). Examples of genres that may be used to sort songs are disco, pop, rock, classical, country, and the like. When a hierarchical format is used, additional navigational buttons may be used to move up and down the hierarchy.

In one embodiment, the user may navigate the songlist while holding the mobile telephone to his or her ear. In this manner, as the user navigates from one song or category to the next, an audio sample is automatically played through the speaker of the mobile telephone. For instance, as the user moves to the category Rock, a short audio recording may be played that has a Rock 'n Roll beat and the word "Rock" may be spoken for the user to hear. Similarly, when the user selects the category Classical, a short audio recording of a piece of classical music, such as piano, may be played and the word "Classical" may be spoken for the user to hear. The short audio recording is preferably approximately five to ten seconds. In this embodiment, when the user is selecting among songs, as the user navigates from one song to the next, a sample of the song is played through the mobile telephone's speaker as the user scrolls over each song in the displayed songlist. Alternatively, the user may be required to press a predetermined button, such as a "sample" button, before the sample of the song will be played. As stated above, samples are preferably taken from a recognizable portion of the song.

In one embodiment, because only the output of the server-based program is sent to the mobile telephone, information regarding the present song or category or highlighted song or category is sent to the DCDS server from the mobile telephone as the user interacts with the plugin program. When the DCDS server receives information that a user has highlighted a new song or category, the DCDS server retrieves the sample from the music samples 317 (FIG. 7, described below) and sends it to the Bluetooth client 111 for playback through the Bluetooth client's speaker (when present). These samples include short audio recordings for the various categories (e.g., genre, artist, album) as well as songs. After the sample is played, the user may press a navigational button (e.g., up and down the songlist, forward and back in the hierarchy) or select the current song.

In step 207 the user selects the current song. The Bluetooth client sends a request in step 209 to the DCDS server to play the selected song over the loudspeakers 109. Upon receiving the user request, the DCDS server processes the request in step 211 and alters the song playlist, according to a predetermined algorithm.

In an alternative embodiment of the invention, the user may navigate and select content orally, using spoken voice commands. This is described in more detail, below.

Figure 3:
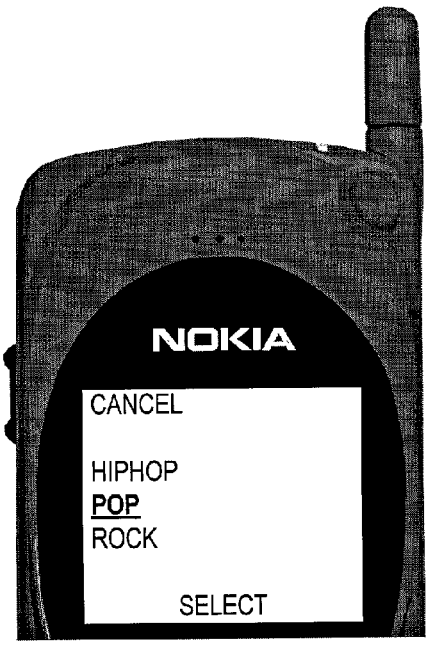
FIG. 3 illustrates a first sample screen when making a request according to an embodiment of the invention.
Figure 4:
FIG. 4 illustrates a second sample screen when making a request according to an embodiment of the invention.

FIG. 3 illustrates a first screen of a sample user interface that may be used on the Bluetooth client device 111. The Bluetooth client displays the categories from which a user may select, such as HipHop, Pop, and Rock. In FIG. 3, Pop is shown as selected by the user. FIG. 4 illustrates a second screen in the sample user interface where a list of Pop songs is displayed. In FIG. 4, the user has selected the song "Yes Sir, I Can Boogie."

Figure 5:
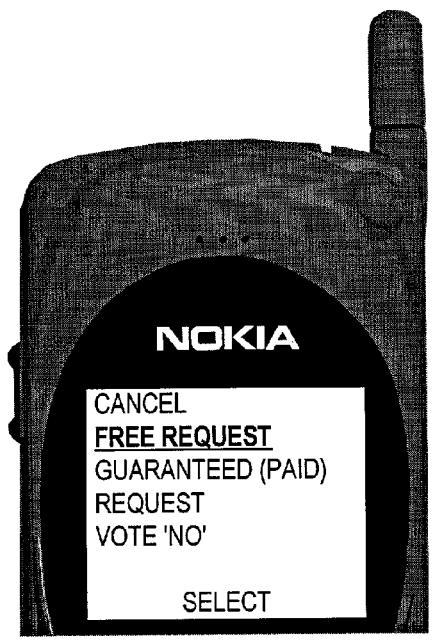
FIG. 5 illustrates a third sample screen when making a request according to an embodiment of the invention.
Figure 6:
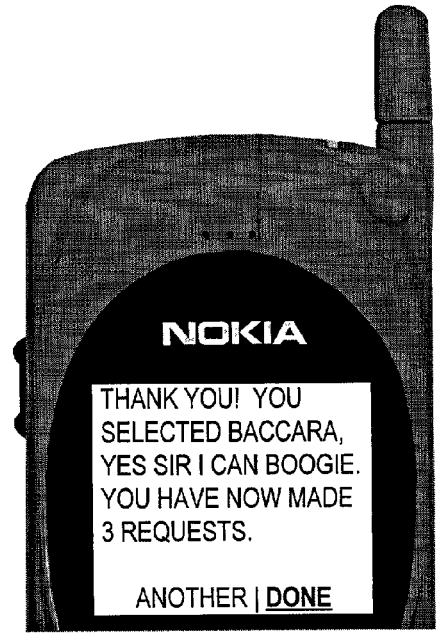
FIG. 6 illustrates a fourth sample screen when making a request according to an embodiment of the invention.

After selecting the song, the user is asked what type of request he or she would like to make, as shown in the third screen of the sample user interface shown in FIG. 5. In various embodiments, the user may make a free request, a guaranteed request (described below), or request that the song not be played (described below). In FIG. 5, the user has selected to make a free request. FIG. 6 illustrates a fourth screen of the sample user interface, providing summary information regarding the user's request(s), and allowing the user to make more requests, or end the request process.

Figure 7:
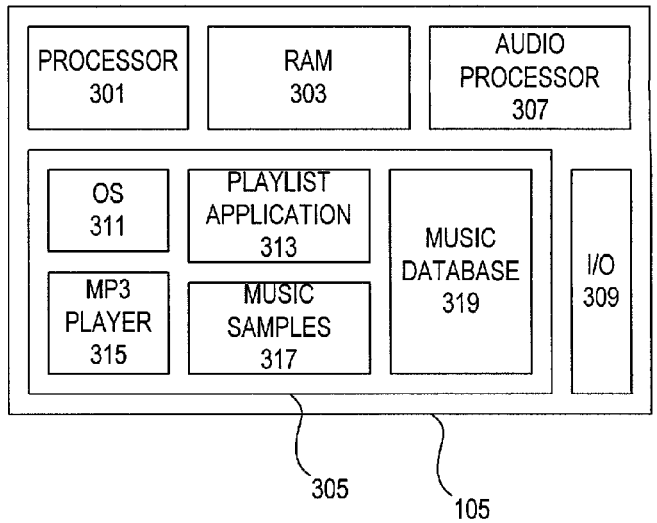
FIG. 7 illustrates a block diagram of a dynamic content delivery system server according to an embodiment of the invention.

FIG. 7 illustrates a block diagram of a DCDS server that may be used in one or more embodiments of the invention. The DCDS server 105 includes a processor 301, RAM 303, non-volatile memory 305, audio processor 307, and I/O 309. The audio processor 307 may be a sound card or other audio processing device capable of producing audio output. The audio output is preferably digital audio output of at least CD quality. However, other output types and qualities may be used depending on system capabilities, user needs, and the like.

The memory 305 may be used to store the DCDS server's operating system 311, the playlist application 313, MP3 player 315, music samples 317, and a music database 319. The MP3 player 315 may be used to playback requested audio recordings after the music file(s) have been retrieved from the music database 319. Music may be stored in the music database 319 in compressed format. The audio recording is output through audio processor 307 to amplifier 107 (FIG. 1). Music samples 317 are used when a user requests to hear a sample of a song in order to determine whether or not to request the song. The music samples should be stored in such a format so as to allow many music samples to be stored in the smallest amount of space. Because the sample is used for identification purposes, and not necessarily for playback over loudspeakers, recording quality is not very important. In one embodiment, the samples are recorded at a sampling rate of 64 k bits per seconds in monophonic sound, limiting each sample to ten seconds. In this manner, each sample should at most use approximately 40 kb of storage.

The playlist application 313 maintains the stored playlist using one or more stored playlist algorithms. Alternatively, the playlist application 313 may select one algorithm from multiple stored algorithms, depending on the DCDS performance desired by the proprietor of the restaurant 101 (FIG. 1).

A first playlist algorithm may prioritize those songs that have been requested (e.g., via free requests) by the greatest number of users. For instance, if song A has received 10 requests, song B has received 13 requests, and song C has received 2 requests, then song B will be played first, song A will be played second, and song C will be played third. Obviously, if the DCDS server receives intervening requests, the playlist selection and order may be modified. Optionally, the algorithm may only count requests by distinct users, so as to prohibit one user from sending multiple requests for the same song in order to force that song to be played. After each song is played, it is removed from the playlist. However, it may again be placed on the playlist if the same song is later requested by another user.

A second playlist algorithm may prioritize songs such that they are played so that each user gets to hear approximately the same proportion of requested songs. That is, if three users have each heard two of their requested songs, and fourth user has only heard one of his or her requested songs, the algorithm will pick a song from the remaining songs to be played that have been requested by the fourth user. In one embodiment that uses this algorithm, the song that the fourth user has requested that is the most requested song overall will be played. For instance, if the fourth user has requested songs A, B, C and D, and song C has already been played, then the algorithm will pick the song from remaining songs A, B and D that has been requested the most times by all the current users, regardless of whether another song not requested by the fourth user, e.g., song E, has received more requests overall. In this manner each user's requests are taken into consideration so that each user is satisfied that his or her requests are being fulfilled.

A third playlist algorithm may take into consideration the type of music to be played. In restaurants where dancing takes place, slow songs and fast songs should not be mixed at random. Instead, slow songs should be played according to a predetermined pattern, such as playing at least two slow songs at a time, and playing the most popular slow song last in each group of slow songs. In restaurants frequented by persons who prefer easy-listening or classical music, rock music and other fast songs should be limited, if played at all. This may also be taken into account by not including songs in the music database that do not match a predetermined DCDS profile that describes what types of songs should be played by the DCDS.

In addition to one or more playlist algorithms, each playlist application may also maintain a default playlist that is to be used when there are no remaining requested songs on the playlist. The default playlist may be manually created by a DCDS administrator, or it may be automatically created based on current popular music, such as from Billboard's THE BILLBOARD 200 chart, or the like. In one embodiment, one or more playlist algorithms may be configured so that music recently requested by a user is not replayed if the song is within the first n positions on the default playlist.

Because each user is submitting requests for songs at the same time other users are requesting songs, there is no guarantee that a user's requested song will be played. One embodiment of the invention allows a user to place a guaranteed request. A guaranteed request is one which will result in the requested song being played within a predetermined amount of time. This may be accomplished by maintaining an additional playlist, a guaranteed playlist, and playing all the songs from the guaranteed playlist before playing any songs from the regular or default playlists. In addition, if multiple users send a guaranteed request for the same song, then playing the song once may fulfill both guaranteed requests. Alternatively, the song is played once for each received guaranteed request.

Figure 18:
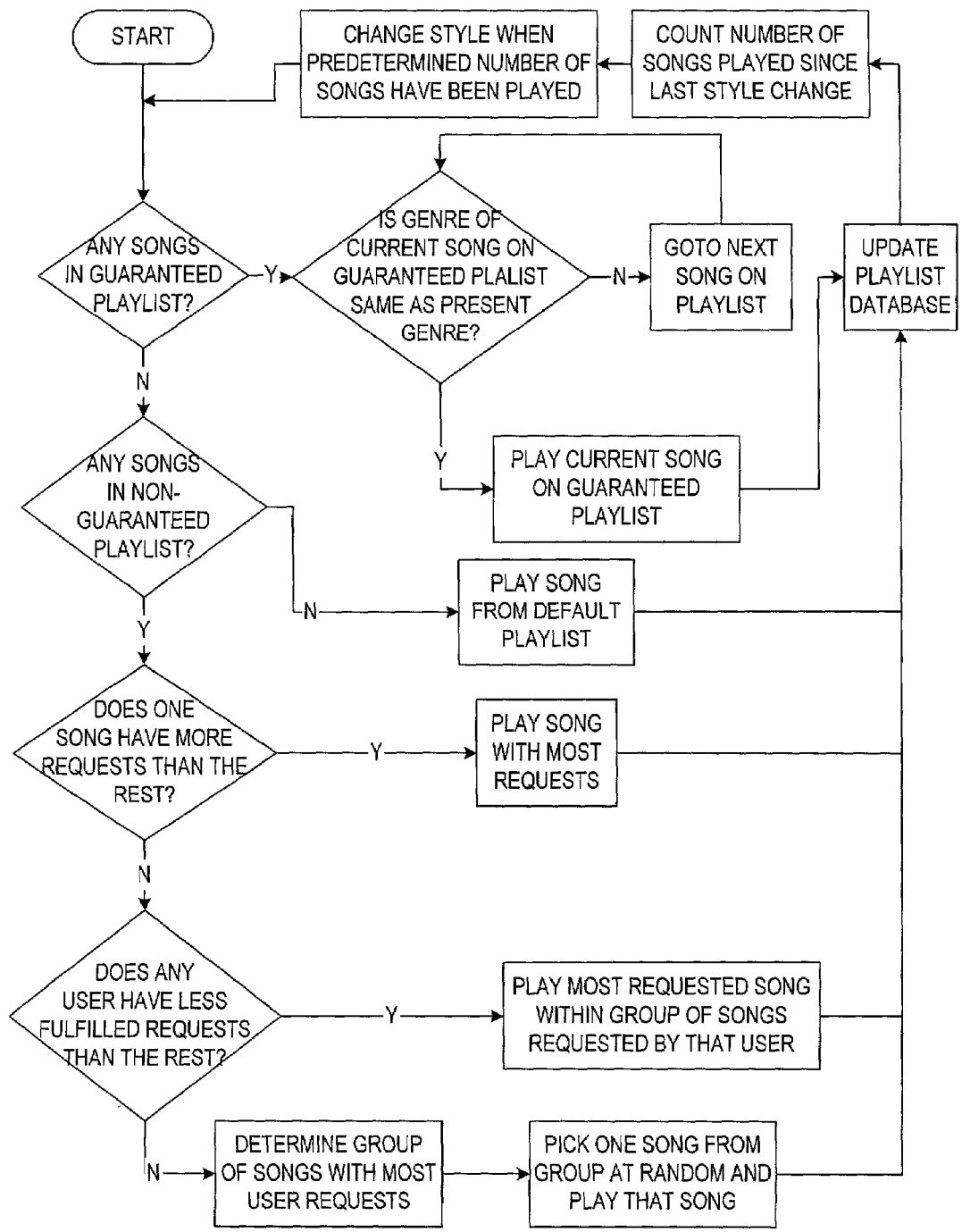
FIG. 18 illustrates a flowchart of an algorithm for determining content to be provided according to an embodiment of the invention.

FIG. 18 illustrates a sample playlist algorithm that may be used, incorporating the above features. Alternative algorithms other than that shown in FIG. 18 may also be used. For instance, the algorithm may also check whether non-guaranteed songs and default playlist songs are of the same genre and style (e.g., slow dance or fast dance) as the presently playing genre and style. Alternatively, the algorithm might not take into account how many requests each user has had fulfilled, and instead determine which song to play next based only on the number of requests each song has received (score-based algorithm). Another algorithm may merely play songs in the order they were requested (queue algorithm).

An algorithm used in one embodiment of the invention is a slot-based algorithm. In a slot-based algorithm, the playlist is divided into slots, where each slot accommodates one song. Once a song is placed in a vacant slot in the playlist, the song is not removed until the song has been played. In this manner, the playlist is fixed and known for some time in advance. However, the playlist might not allow slots to be filled too far in advance (e.g. one hour, half an hour, fifteen minutes, etc.) so that it remains dynamic in response to user requests. When a slot opens up, the slot may be populated with a song according to a number of user requests, a secondary playlist algorithm, or other like manner.

Other alternative algorithms will be readily apparent to those of skill in the art. For instance, a combined score and slot-based algorithm may also be used. That is, generally songs are selected based on user requests, but at specified times songs are chosen according to a schedule. In this manner, the operator can guarantee that a specified song will be played, regardless of whether users are requesting other songs.

In some embodiments, a weighting scheme may be used by the playlist algorithm to select a song from multiple possible songs (weight-based selection algorithm). Weight-based selection algorithms are especially useful in embodiments where the user makes a request that does not correspond to a single song. For instance, if a user merely requests "Can't Help Falling in Love," two songs may be returned by the query—the Elvis Presley version and the UB40 version. A weight-based selection algorithm compensates for such multiple hits by weighting the request to each returned song according to weight values associated with each song.

One weight-based selection algorithm that may be used is to grant each request a predetermined number of points, and to divide the points equally among all possible song matches. For example, if each user request is worth one hundred points, and a user's request returns four possible matches, each match will receive twenty-five points. The points are added to each song's respective total score and taken into account by the playlist algorithm (e.g., a score-based algorithm will play the song with the highest total number of points).

In another weight-based selection algorithm, each request is again allotted a predetermined number of points that are equally distributed among all returned songs by a query. However, each song stored in the song database is also associated with a predetermined weight, for example, integer values from one to five. The equally distributed points are multiplied by each song's associated weight to determine the song score that is used by the playlist in determining the next song to play. For example, if a user requested an Elvis song, and four songs by Elvis, weighted 3, 3, 5, 1, respectively, were stored in the music database, the songs would receive 75 points, 75 points, 125 points, and 25 points, respectively, if each user request was allotted one hundred points, as above.

Another weight-based selection algorithm that may be used assigns a profile weight to each of the different song attributes (e.g., genre, artist, album, title). For example, a DCDS may be configured to use weights of 1 for genre, 4 for artist, 6 for album, and 10 for title. When a user makes a song request, the DCDS compares the returned hits to the current DCDS profile to determine which hits match the profile for any or all of the attributes. For each attribute that matches the DCDS profile, the song receives the corresponding weight added to its score. For example, a user requests an Elvis song, and the two Elvis songs "Jailhouse Rock" with the additional attribute Genre=Rock, and "Love Me Tender" with the additional attribute Genre=Ballad, are stored in the music database. If the DCDS profile includes rock music, but excludes ballads, "Jailhouse Rock" will receive five points (i.e., because Artist and Genre match) and "Love Me Tender" will receive four points (i.e., because only Artist matches), not taking into account the album on which each song may be found.

In yet another weight-based selection algorithm that may be used, in addition to each attribute being weighted by the DCDS profile, each attribute of each song may also be weighted. For instance, "Jailhouse Rock" may have weights of eight for Genre (Rock) ten for Artist (Elvis Presley), three for Album, and seven for Title, while "Love Me Tender" may have weights of three for Genre (Ballad), ten for Artist (Elvis Presley), four for Album, and five for Title. By keeping weights within a predetermined range (e.g., 1–10), or one of a predetermined set of values (e.g., 0.1, 0.25, 1, 4, and 10), score ranges are kept within a known range. The song score may be calculated by multiplying the weight of each attribute by the weight of the DJ preference, as shown in Equation 1, below.

$$((P_G * S_G) + (P_A * S_A) + (P_L * S_L) + (P_T * S_T)) = \text{song score} \quad \text{(Equation 1)}$$

Where $P_G$ is the profile genre weight, $S_G$ is the song genre weight, $P_A$ is the profile artist weight, $S_A$ is the song artist weight, $P_L$ is the profile album weight, $S_L$ is the song album weight, $P_T$ is the profile title weight, and $S_T$ is the song title weight. The song "Jailhouse Rock" by Elvis Presley, according to the above example, will receive 136 points, while "Love Me Tender" will receive 117 points. As a result, depending on the playlist algorithm used, "Jailhouse Rock" may be chosen instead of "Love Me Tender," or both songs may be incorporated into the playlist based on their respective scores. In a DCDS that uses a score-based algorithm, the resultant score is added to the song's score already in the playlist, and the playlist algorithm modifies the playlist order based on the new song score totals so that the scheduler plays the song with highest score. Once a song has been played, it may be removed from the playlist altogether, or its song score may be decreased by a predetermined value. The playlist can be initialized by using DJ profile data as initial data for the playlist score generation.

Figure 8:
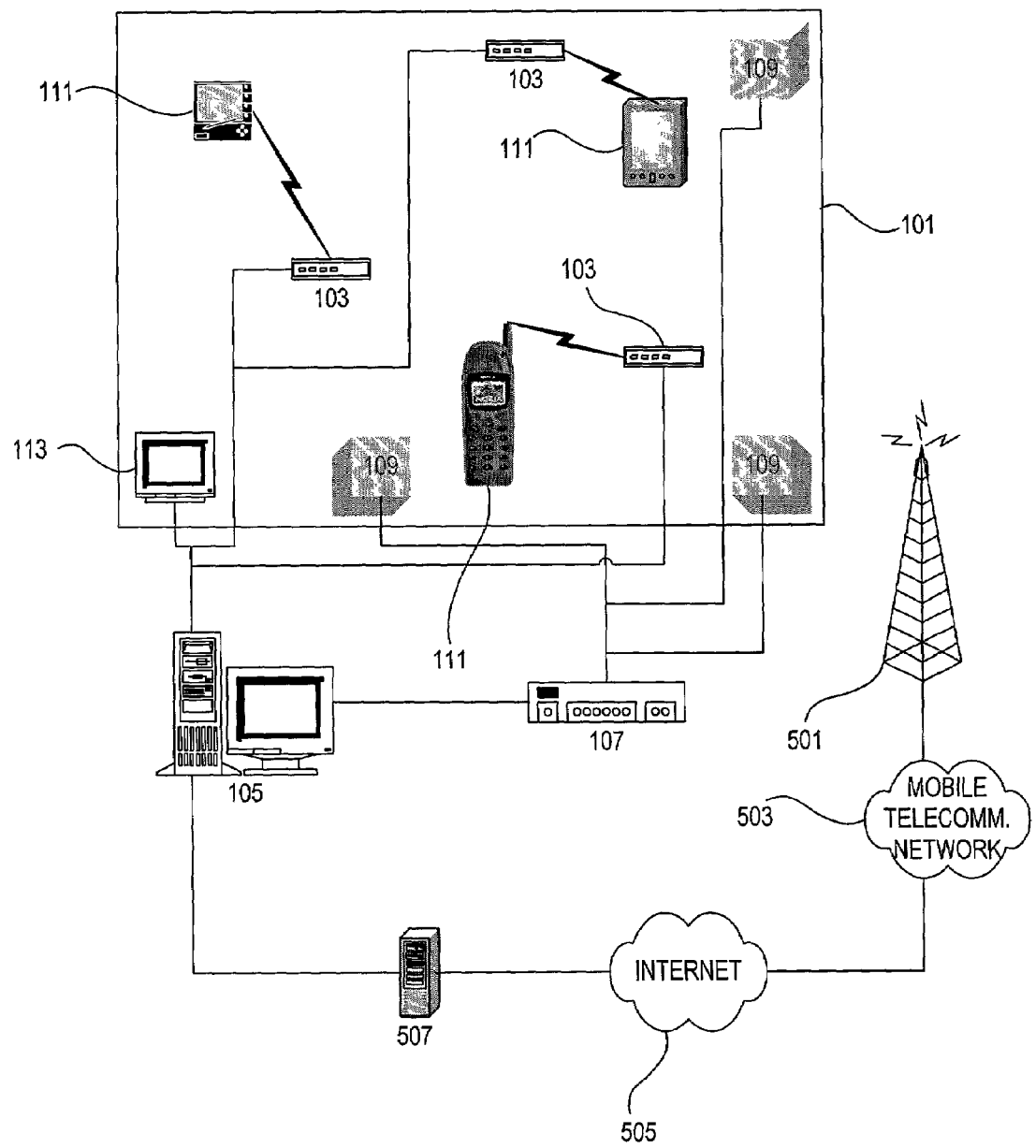
FIG. 8 illustrates a dynamic content delivery system according to an embodiment of the invention.

As stated above, a request may be designated a guaranteed request. In one embodiment, this is accomplished by the user paying a fee in conjunction with the request. FIG. 8 illustrates a DCDS configured to accept guaranteed requests in exchange for the user paying a fee. Additional elements include a mobile communications network radio tower 501, mobile telecommunications network 503, global communication network (e.g., Internet) 505, and an SMS server 507. The SMS server may be owned and operated by the operator of the DCDS, or alternatively by a third party.

The charging mechanism through which a user may pay for a guaranteed request may be an SMS message sent through one or more networks (e.g., GSM mobile telecommunications network and the Internet) to the server 507 equipped to receive SMS messages. The resulting charge is added to the user's mobile telephone bill. When the SMS server 507 has received the SMS message and completed the charge, the SMS server 507 sends notification of the successful charge to the DCDS server 105 and back to the user. In the event the charge is unsuccessful, a response is sent to the user's mobile telephone informing him or her of the result. The DCDS server 105 may optionally determine whether the requested song meets the criteria for being played (e.g., in the DCDS profile) before instructing the user's Bluetooth client device 111 to submit the SMS charge request. Also, the DCDS server 105 may additionally inform the user when the song is being played.

In one embodiment of the invention, an application stored in the mobile terminal acts as an interface to create and send SMS messages to the SMS server 507. The SMS interface application may provide menus of options and songs, and automatically create the appropriate SMS message based on the user's selection(s). Alternatively, the user may create a SMS message in a format as independently described to the user, such as via a brochure or instruction sheet at the location where the song is to be played. The predetermined format may be any of various formats, as long as the format is understood by the SMS server. For instance, the format <DCDS server name>.<genre>.<artist>.<title> may be used to describe a particular song. To request the song *Bicycle Race* by Queen at a location whose DCDS server is named DDJ (Digital DJ), the SMS text message would be "DDJ.rock.queen.bicycle race."

In either of the above embodiments, the SMS message may be validated to ensure that the message is of the correct format, that the spelling is correct, and also that the DCDS has the requested song. The validation may be performed by the SMS interface application, when available, or by the SMS server itself. When the SMS server performs the validation, a return message may be sent to the mobile terminal when an error is detected.

Figure 9:
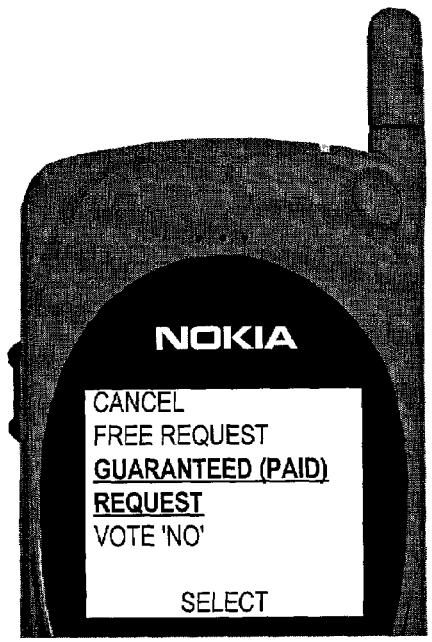
FIG. 9 illustrates a fifth sample screen when making a request according to an embodiment of the invention.
Figure 10:
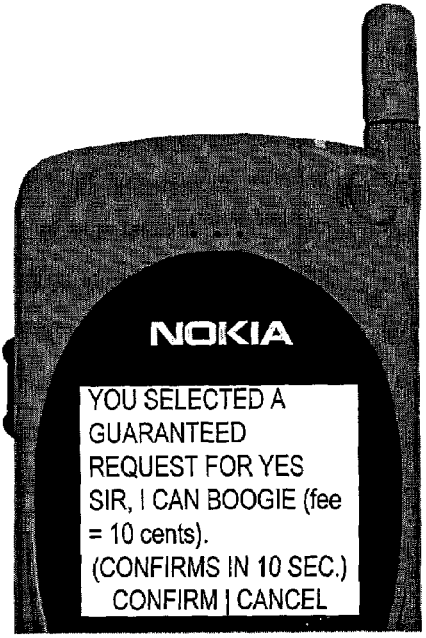
FIG. 10 illustrates a sixth sample screen when making a request according to an embodiment of the invention.
Figure 11:
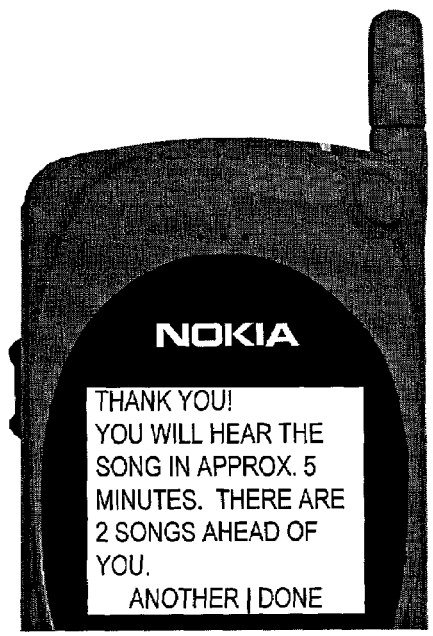
FIG. 11 illustrates a seventh sample screen when making a request according to an embodiment of the invention.

When the user selects a guaranteed request, as shown in FIG. 9, the user may be given the option to cancel the request, as shown in FIG. 10, because the request may result in the user being charged a fee. In one embodiment, the request is automatically confirmed if it is not canceled within a predetermined amount of time, as shown in FIG. 10. In another embodiment, the request is automatically canceled if it is not confirmed in a predetermined amount of time (not shown). If the user confirms or does not cancel the request, a response message is displayed on the Bluetooth client's 111 display screen, as shown in FIG. 11. The user may then choose whether to make another request or to end the request process. In some embodiments, guaranteed requests may have different levels. For instance, when a user pays ten cents in connection with a request, the requested song may be added to the guaranteed playlist. However, when the user pays one dollar in connection with the request, the requested song may be placed at the top of the guaranteed playlist so that the user can hear his or her song before other guaranteed songs. In yet another embodiment, users may bid for placing their request on the top of the playlist. In this embodiment, the user with the highest bid when the previous song ends will have his or her song played next, and the user will be charged the bid amount.

Figure 12:
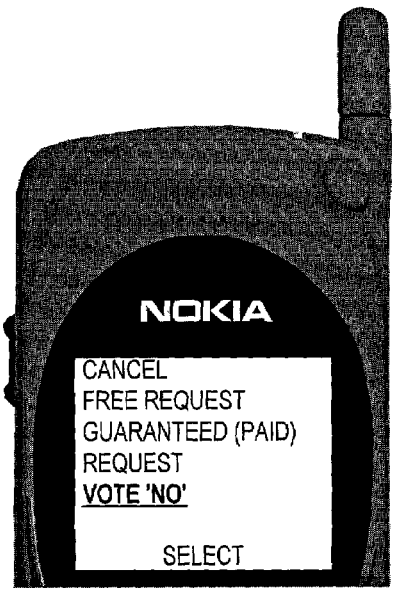
FIG. 12 illustrates an eighth sample screen when making a request according to an embodiment of the invention.
Figure 13:
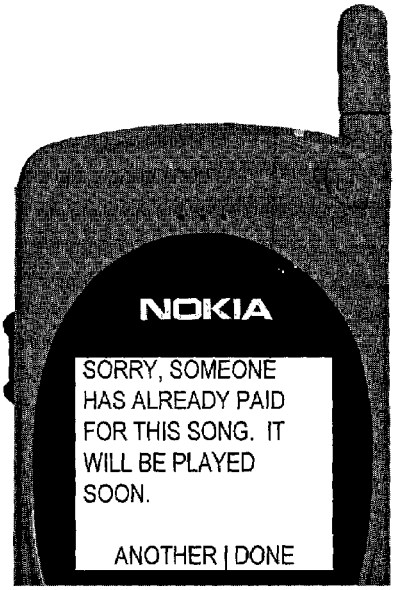
FIG. 13 illustrates a ninth sample screen when making a request according to an embodiment of the invention.
Figure 14:
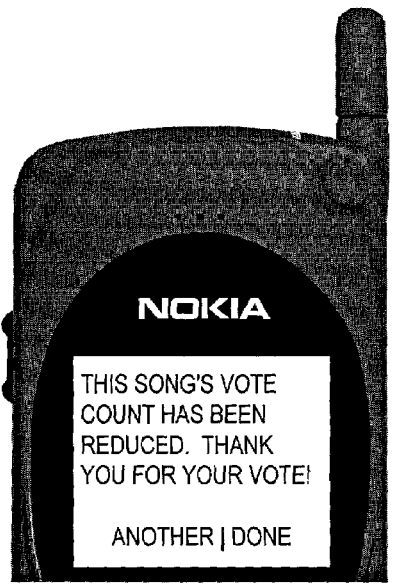
FIG. 14 illustrates a tenth sample screen when making a request according to an embodiment of the invention.
Figure 15:
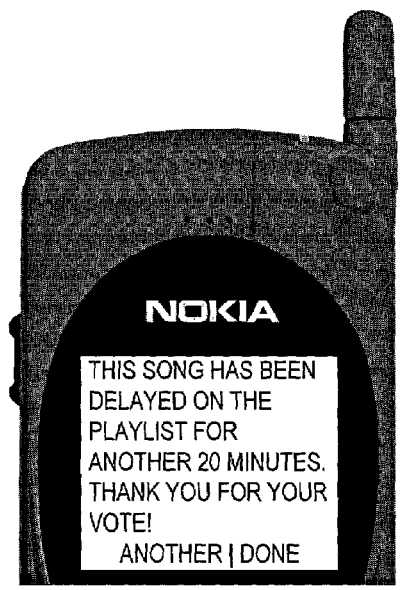
FIG. 15 illustrates an eleventh sample screen when making a request according to an embodiment of the invention.

In another embodiment of the invention, also referred to in FIG. 5, the user may make a negative request for a selected audio recording. That is, the user can request that the song not be played, as shown in FIG. 12. When a user makes a negative request, the DCDS may respond in various ways. As shown in FIG. 13, a song will not be cancelled when another user has already paid to hear that song (i.e. the other user has made a guaranteed request for that song). However, as shown in FIG. 14, when the song has only received non-guaranteed requests, the vote count for the song may be reduced (e.g., by one vote) for each negative vote received. However, a one to one weighting scheme between positive and negative votes is not required. Also, if the song has not received any positive votes, but it is on the default playlist, then a negative vote may delay the DCDS from playing the song for a predetermined amount of time, as shown in FIG. 15.

With reference back to FIG. 1, while a song is being played over the loudspeakers 109, information about the song may be displayed on the monitor 113. The information displayed may include such information as the song's author, title, and any album(s) on which the song may be found. In addition, the DCDS may display the song's lyrics, the most requested songs (and optionally each song's number of votes), the playlist of recently played songs, dancing instructions for the presently playing song (e.g., where the song is a well known dance song, such as the Charleston or Macarena), an animation or video illustrating how to dance to the presently playing song, statistics regarding requested and played songs (e.g., genres and their percentages being played), or a music video that accompanies the song. In one embodiment, where the location 101 is a karaoke bar, the display screen may display the karaoke video with lyrics that corresponds to the selected song. Alternatively, the content itself (e.g., a video) may be played on the monitor 113.

Figure 16:
FIG. 16 illustrates a main menu screen according to an embodiment of the invention.

In addition to displaying the information on the monitor 109, the information may be provided to a Bluetooth client device 111. From a main menu displayed on the Bluetooth client device 111, as shown in FIG. 16, a user associated with the device 111 may request information regarding the presently playing song. The user may also select to make a request, which will result in the display of information shown in FIG. 3, or the user may select to view instructions for how to use the system (not shown).

When the user requests additional information regarding the currently playing song, a menu may be displayed (not shown) that allows the user to select the information that he or she desires to view. The menu may instruct the user to press specific keys to display various types of information. For instance, the user may be instructed to press 1 to receive general information about the current song (e.g., artist, title, album, genre), to press 2 to view the most requested songs (and optionally each song's number of votes), to press 3 to view a list of recently played songs, to press 4 to view dancing instructions, to press 5 to view animation instructing how to dance, to press 6 to view statistics regards songs that have been played within a predetermined amount of time, and to press 7 to view the music video for the song. The corresponding information may then be displayed on the display screen of the Bluetooth client device 111.

Some embodiments of the DCDS use hybrid networks in order to perform according to the above description. For example, with reference to FIG. 8, a Bluetooth connection to a conventional PC network (e.g., Novell or Microsoft network) is used to communicate requests from users and to playback music over loudspeakers, while a mobile telecommunications network such as GSM is used to pay for requests using SMS capabilities. Billing may also be performed using other GSM billing methods, for example, by automatic call to a predetermined service provider number, using WAP, or the like. By using hybrid networks, services can add value that is not available to single-access networks, such as using the dynamic content delivery system as described herein.

In one embodiment of the invention, the DCDS is not limited to a single location 101, but rather is provided over hybrid networks to a wider audience than the single location embodiment described above. This embodiment uses a broadband, unidirectional access network and a narrowband, bi-directional access network to provide DCDS services. For instance, the DCDS may use a bi-directional, narrowband network such as a General Packet switched Radio System (GPRS) or GSM cellular network to receive and acknowledge requests for content from users, and use a unidirectional broadband network to deliver the requested content to one or more users. Examples of uni-directional broadband networks that may be used include Terrestrial Digital Video Broadcasting (DVB-T), DVB-S, DAB, ATSC, ISDB-T, WLAN, 3G (e.g., UMTS), Bluetooth, and HyperLAN2 networks. In addition, any network (bi-directional or unidirectional) supporting multicast (e.g., WLAN) may act as a logical unidirectional network. It should also be appreciated that the narrowband and broadband networks may be different logical networks within the same physical network, such as in WLAN or cable networks. In addition, the invention may be performed using conventional, hardwired networks as well as wireless networks. For instance, a traditional hardwired PSTN may be used as the narrowband, bi-directional network.

Figure 19:
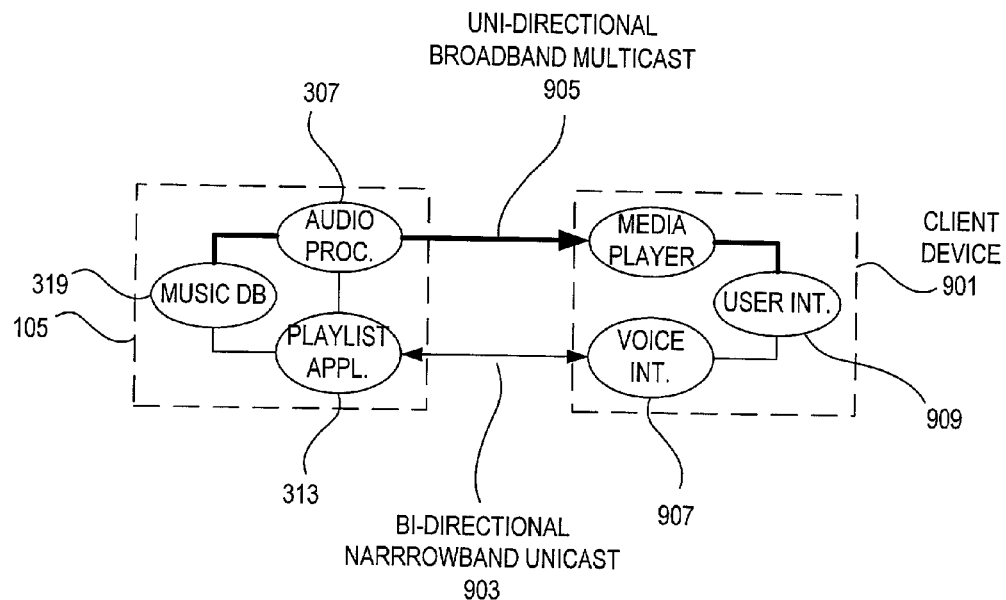
FIG. 19 illustrates a data flow diagram according to an embodiment of the invention.

With reference to FIG. 19, the DCDS automates the services performed by a human disc jockey (DJ) by allowing users to make requests for music to an automated radio station using a narrowband, bi-directional network 903. The DCDS broadcasts the resultant content to one or more client devices 901 using a unidirectional broadband network 905. DCDS server 105 may be an automated radio station or other content delivery service. As with the single location embodiment described above, the music may be stored in a music database 319, and served by the DCDS 105 over the network 905 as directed by the playlist application 313 through the audio processor 307.

In one embodiment, as shown in FIG. 19, the user interface to the DCDS may be a natural voice request by a user for an audio recording. The voice request may be followed by an audio response from the DCDS back to the user. A user may speak the name of the music he or she wants to hear, and the voice interface 907 performs automatic speech recognition (ASR) to interpret the spoken request. The user verbally provides a song title, artist's name, album title, and/or genre from which the DCDS may interpret the request. A more traditional user interface comprising selecting items from menus as described above may also be used. The user interface 909 may include a speaker for playback of music, a microphone for receiving voice input, display screen, and input buttons, depending on the client device 901 being used.

Multiple users may access the radio station DCDS 105 and listen to the music whether or not they choose to also make a request. Additionally, the same broadband audio stream may be shared by all users, reducing the required bandwidth, while each user receives perceived personalized service through the DCDS's fulfillment of user requests. Therefore, there is a user perception of getting rich personal media service without increased costs to the DCDS provider.

When a user accesses the DCDS 105, both the radio station and voice interface may be made available to the user. For instance, upon initialization of the media player, the media player may automatically tune to the radio station's multicast stream and the speech/text voice recognition system 907 may become active, i.e., listening and responding to the user.

The user may use natural speech to request pieces of music. The music is described using a partial or complete list of parameters including title, album, artist (or group) and genre. For instance, saying "Pop, Madonna, Music, Music" would refer to the song entitled Music on the album Music by the artist Madonna in the genre Pop. Natural language processing may also be employed, such that the DCDS 105 understands a user when he or she says "Hey Mister DJ put Madonna's Music on" to refer to the same song.

As stated above, the DCDS may respond to each user by playing a relevant audible comment indicating that the request has been received and understood, and also optionally give some indication of the length of time before the song is played. For instance "Madonna's a great choice, I hope to play it in the next hour." This dialogue may be tailored to each user request, and sent only to the requesting user via the narrowband network 903.

Because various users may have substantially different equipment, hybrid networks allow each user to connect to and benefit from the DCDS. A traditional computer (PC) user typically has a lot of local processing power and storage space. He or she is also more likely to be operating in a quiet environment with a high-fidelity microphone and speakers. The bi-directional narrowband network may be 50 kbps (e.g. over a PSTN modem) or higher (e.g., via DSL, cable, or LAN/WAN) with a reasonably low per-bit cost.

A super mobile user may have reasonable processing power from a laptop PC, a pocket PC such as a personal digital assistant (PDA), or a communicator device. Battery power will be limited and narrowband access may vary substantially from 1 Mbps WirelessLAN (WLAN) to 9.6 kbps GSM with much higher per bit or access time costs. The sound environment may be quite hostile and medium-fidelity audio equipment is most likely.

An ordinary handset user (e.g., mobile telephone) is unlikely to have much local processing power or storage space. He or she may have speech codes and a natural voice input. The operating environment may be acoustically hostile and sound output may be low fidelity.

The DCDS may maintain a user profile associated with each user so as to tailor its performance for each user. Recording a history of a specific user's requests and feedback provides the ability to enhance the service's personalization level. Examples include the use of more detailed comments (and avoiding repetition), profiling listener groups for advertising revenue, and adding services such as concert announcements and selling digital music licenses.

Through a user profile screen (not shown), users may choose a skin to use with the DCDS. The term "skin" comes from the personalized looks available for many media players while not altering the functionality of the media player. The DCDS skin may be used to turn comments into user styled comments with an alternative personality. For instance, "Great choice, playing soon" may alternatively become "Awesome style dude, it's coming right to you" when a user switches to a "Surfer" skin.

In a preferred embodiment, speech is translated to text (i.e. data) and back again so that the human user may provide input verbally and the software can interpret responses appropriately. At least three distinct scenarios are possible dependent on where the speech processing is performed. First, the speech processing may be client based. The client only sends and receives non-voice data. Speech is recognized and synthesized locally on the user device (i.e., the client), such as is shown in FIG. 19.

Second, speech processing may be DCDS (network) based. Server software receives speech from the user and returns human understandable speech to the user. The transmission of the speech may be real-time (e.g. a phone-in service) or packetized (e.g. sent as a PCM encoded wave file or codec compressed).

Third, speech processing may use a remote speech recognition engine. A third party may offer a speech recognition service to the client (user) and the content provider. The resulting data may be sent directly to the DCDS or returned to the client for transmission to the DCDS. Distribution of the active vocabulary to all parties (i.e., the user, the remote speech recognition engine, and the automated DJ) should be performed so that each party is using the same vocabulary.

The data flow of one embodiment of the DCDS is illustrated with reference to FIG. 19. A user makes a verbal request by speaking into user interface 909. The request is translated to text and/or data by the voice interface 907, which sends the request data to the DCDS server 105. The DCDS server receives the request and identifies the song(s) to which it applies. According to its own profile (i.e., determine if the song is of a type the DCDS radio station will play), logic in the DCDS playlist application 313 determines which songs should be advanced (or demoted) on a play-list and communicates this to a scheduler. The scheduler may be incorporated as part of the playlist application, as shown in FIG. 1, or it may be a separate logical component of the DCDS server 105. The DCDS server broadcasts music over the broadband, unidirectional network, which is received by the client device 901, and played over the client device's speaker. The DCDS server also generates a response to the user after each request, which is sent back to the voice interface 907 for playback to the user via user interface 909.

It is generally recognized that speech synthesis requires less processor power than speech recognition. On the other hand, it often consumes more local storage space (memory). However, many mobile phone handsets currently include simple speech recognition capabilities. By keeping the active vocabulary to a minimum at any given time, speech recognition may be performed by the client device based on existing voice tag techniques. Dependent on user and system needs and requirements, speech recognition may also be performed by other than the client device.

The above-described architecture is generic, thus it may be easily scaled according to an organization's needs. Each client is able to access multiple DCDSs, each using a separate skin if desired. Also, the computational requirements of the DCDS's intelligence are such that each DCDS may support many clients at any given time.

Figure 20:
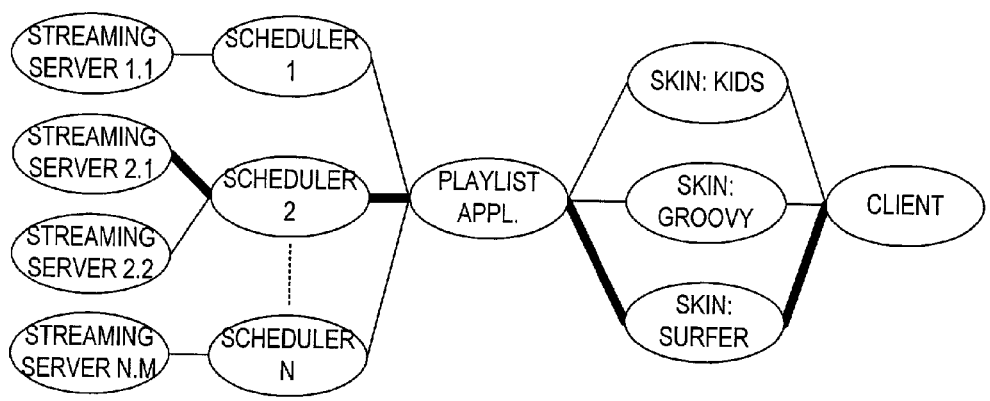
FIG. 20 illustrates logical connections according to an embodiment of the invention.

In one embodiment, with reference to FIG. 20, the DCDS may control multiple radio stations. In this embodiment, the DCDS applies each user's request to the most suitable radio station. The DCDS may also maintain a separate scheduler for each radio station, or alternatively may use one schedule for multiple radio stations. For instance, the DCDS would apply a user request for a Top 40 hit song to a radio station that plays Top 40 hits, while a classical music request may be applied to a radio station of the genre Classical or Easy Listening. In this manner, a user may maintain a connection with a specific radio station in order to listen to music desirable to that user, without having to listen to music of genres that the user dislikes. The darkened line in FIG. 20 illustrates that a user is presently listening to a radio station being served by streaming server 2.1, and that the user is interacting with the DCDS using the surfer skin. Optionally, after processing a user's request, the DCDS may inform the user on which radio station or streaming server the request will be played, when more than one are present.

Using prerecorded prompts whenever possible may be preferable for speech output to the user because the quality can be easily maximized. However, prompts need to be re-recorded whenever a change is required. Moreover, the voice will always be exactly the same, so additional memory is required for each new skin stored in the device. Alternatively, text-to-speech synthesis may be preferable as it provides greater flexibility in the choice of prompts and skin styles. Example of text-to-speech (TTS) technology that may be used are formant synthesis and concatenative synthesis, both of which are known in the art.

Processing in the client device is not subject to strict timing constraints. For instance, a two second delay between request and response is acceptable and would give time for the client TTS to speak back the request as a confirmation. In an embodiment where the whole voice interface is implemented in the client device, substantial processing power and memory may be required. When speech recognition is performed in the server, only speech encoding may be needed in the terminal.

As discussed above, content delivery of musical selections may be provided via the broadband network 905. In one embodiment, the framework in which the media content is delivered may include the following elements: Digital Item Declaration (structure of the fundamental unit of distribution and transaction), Digital Item Identification and Description (unique identification and description of the content), Content Handling and Usage (management and delivery), Intellectual Property Management and Protection (Digital Rights Management), Terminals and Networks (Quality of Service management), Content Representation (formats of "plain" content, excluding description), and Event Reporting (e.g. transactions).

Digital Item Declaration is a flexible model or representation of a content item that can enable varying services without the need to stick to a fixed content structure. In the DCDS the content delivered may be a package consisting of not only the audio recording but also lyrics, text, pictures of the artist, video, etc.—many different structures can easily be imagined by one of skill in the art. Digital Item Identification and Description provides unique identification of a digital item, enabling transactions and tracking of usage. In the DCDS it is part of the broadcast system, discussed below.

One enabler of interaction with broadcast services is the availability of content descriptions in electronic form. This makes automated search and selection of content possible. Ideally the descriptions should be machine understandable, not only machine-readable. The format (coding) of content descriptions may take any of a variety of forms. Some content description schemes suitable for the DCDS application include ID3, MPEG-7, XML or the like, as are known in the art.

There are also other content description schemes suitable for music audio and multimedia. Other organizations working on multimedia description schemes include Society for Motion Picture and Television Engineers/European Broadcasting Union (SMPTE/EBU) task force, Digital Video Broadcasting-Service Information (DVB-SI) and European Committee for Standardization/Information Society Standardization System (CEN/ISS).

Intellectual Property Management and Protection, also referred to as Digital Rights Management, includes management of the legal rights associated with the content. There are two aspects to digital rights management: enforcing the rights by protection from illegal use and maintaining a protected description of the rights.

In business-to-business electronic content delivery (back-end in the content delivery chain) there generally is a reasonable basis for trust between business entities. Therefore technical protection against illegal copying is not as important. Technical measures such as encryption may be used for additional security, especially if protection of the delivery channel is not very good.

Description of the rights is part of the content description, but manipulation of these descriptions calls for special attention. The descriptions should remain protected but up to date. Copy protection and rights management may be important when content is delivered digitally to the end user's client device. In that case only certified client implementations or client devices enforcing the rights management may access the content.

Digital rights management does not significantly change when making a digital broadcast service interactive via a hybrid network, as is done in the DCDS. However, in the case of advanced interaction with structured (object oriented) content and associated rights, the rights description should be detailed enough to allow use of different combinations of objects.

In one embodiment, the client device reports back to the DCDS when it plays back each streamed audio file to the user. This allows the DCDS to calculate royalties that should be paid to the copyright owner(s) of the delivered content. Automatic reporting systems use unique ID information (Digital Item Identification) to report back to the DCDS.

The DCDS receives database queries (e.g., via the voice interface 907 when the user interface is voice responsive) from the client device 901 that are performed on the music database. Each search may produce one or more matches from the database (if no matches result then an error message is returned to the user), as in the Elvis example, above. When more than one match is returned, each match is processed independently. That is, "Jailhouse Rock" and "Love Me Tender" are both processed according to the weighting scheme (if applicable) and playlist algorithm. Alternatively, when more than one match is returned, the user may be presented with a list of the returned matches in order to select one song from the returned list or, as previously described, the user may listen to samples from each of the returned songs in order to determine which song he or she would like to request. When only one match is returned by the query, the matching song may be automatically added to the playlist according to the playlist algorithm presently in use.

One embodiment of the DCDS records failed requests. That is, the DCDS records when a user requests a song that is not stored in the music database. Using this information the administrator may obtain and store the new music into the music database, so that the next time a user requests the same song, it may be played.

It should be appreciated by those skilled in the art that the invention described herein may be used not only for streaming content, but also for block transfers of content. In a similar manner to that described above, users may vote for specific file downloads, such as games, music, video, or other data files.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. A method for delivering content, comprising the steps of:
   (i) a content server sending a list of selectable content items to a mobile terminal over a wireless network;
   (ii) receiving a request at the content server from the mobile terminal, wherein the request corresponds to a user-selected content item from the list of selectable content items; and
   (iii) responsive to receiving the request, the content server playing a first content item through an output device separate from the mobile terminal.

2. The method of claim 1, wherein the content server plays content items according to a playlist.

3. The method of claim 2, wherein the playlist is maintained according to a predetermined algorithm.

4. The method of claim 3, wherein the predetermined algorithm comprises playing the content item that has received the most requests from users of mobile terminals.

5. The method of claim 3, wherein the predetermined algorithm comprises playing content items such that each of a plurality of users has approximately the same number of fulfilled requests.

6. The method of claim 3, wherein the predetermined algorithm comprises weights associated with each content item, and further comprising the step of playing the content item with the greatest total weight.

7. The method of claim 1, wherein the content item comprises music and the output device comprises a speaker.

8. The method of claim 1, wherein the content item comprises video and the output device comprises a video display device.

9. The method of claim 1, further comprising the step of sending a sample to the mobile terminal, wherein the sample comprises a portion of a user-selectable content item.

10. The method of claim 1, wherein the request is a request to play the user-selected content item.

11. The method of claim 1, wherein the request is a request not to play the user-selected content item, and further comprising the step of delaying playback of the user-selected content item responsive to receiving the request.

12. The method of claim 1, wherein the request is a guaranteed request, and further comprising the steps of:
   (iv) receiving at the content server an acknowledgement that a user associated with the mobile device has paid a fee in connection with submitting the guaranteed request; and
   (v) requiring the user-selected content item to be played.

13. The method of claim 12, further comprising the steps of:
   (vi) storing the request in a guaranteed playlist; and
   (vii) playing content items associated with requests stored in the guaranteed playlist before playing content items not associated with requests stored in the guaranteed playlist.

14. The method of claim 1, wherein request is received through a short-range transceiver.

15. The method of claim 1, wherein steps (i)–(ii) are performed over a narrowband network, and wherein step (iii) is performed over a broadband network.

16. The method of claim 15, wherein the narrowband network comprises a GPRS network and the broadband network comprises a DVB-T network.

17. The method of claim 15, wherein the mobile terminal comprises a mobile telephone.

18. The method of claim 1, further comprising the steps of:
   (iv) receiving speech input from a user;
   (v) recognizing the received speech; and
   (vi) converting the received speech into the request.

19. The method of claim 1, further comprising the steps of sending an acknowledgement to the mobile terminal responsive to receiving the request.

20. The method of claim 19, wherein the acknowledgement comprises an audio recording played through a speaker on the mobile terminal.

21. The method of claim 20, wherein the acknowledgement is presented in a style responsive to a user selected skin.

22. The method of claim 19, wherein the acknowledgement comprises a message displayed on a display screen on the mobile terminal.

23. The method of claim 1, wherein each content item is associated with a genre, and further comprising the step of the content server playing the first content item through an output device associated with a same genre as the first content item.

24. A content server, comprising:
   a processor; and
   memory for storing a content database and computer readable instructions that, when executed by the processor, cause the content server to perform the steps of:
   (i) sending a list of selectable content items to a mobile terminal over a wireless network;
   (ii) receiving a request from the mobile terminal, wherein the request corresponds to a user-selected content item from the list of selectable content items; and
   (iii) responsive to receiving the request, playing a first content item through an output device separate from the mobile terminal.

25. The content server of claim 24, wherein the first content item is the next item on a playlist.

26. The content server of claim 25, wherein the playlist is maintained by the content server according to a predetermined algorithm.

27. The content server of claim 26, wherein the predetermined algorithm comprises playing the content item that has received the most requests from users of mobile terminals.

28. The content server of claim 26, wherein the predetermined algorithm comprises playing content items such that each of a plurality of users has approximately the same number of fulfilled requests.

29. The content server of claim 26, wherein the predetermined algorithm comprises weights associated with each content item, and the instructions further comprise the step of playing the content item with the greatest total weight.

30. The content server of claim 24, wherein the content item comprises music and the output device comprises a speaker.

31. The content server of claim 24, wherein the content item comprises video and the output device comprises a display device.

32. The content server of claim 24, wherein the computer readable instructions further comprise the step of sending a sample to the mobile terminal, wherein the sample comprises a portion of a user-selectable content item.

33. The content server of claim 24, wherein the request comprises a request to play the user-selected content item.

34. The content server of claim 24, wherein the request comprises a request not to play the user-selected content item, and wherein the computer readable instructions further comprise the step of delaying playback of the user-selected content item responsive to receiving the request.

35. The content server of claim 24, wherein the request is a guaranteed request, and wherein the computer readable instructions further comprise the steps of:
 (iv) receiving an acknowledgement that a user associated with the mobile terminal has paid a fee in connection with submitting the guaranteed request; and
 (v) requiring the user-selected content item to be played.

36. The content server of claim 35, wherein the computer readable instructions further comprise the steps of:
 (vi) storing the request in a guaranteed playlist; and
 (vii) playing content items associated with requests stored in the guaranteed playlist before playing content items not associated with requests stored in the guaranteed playlist.

37. The content server of claim 24, wherein the request is received through a short-range transceiver.

38. The content server of claim 24, wherein steps (i)–(ii) are performed over a narrowband network, and wherein step (ii) is performed over a broadband network.

39. The content server of claim 38, wherein the narrowband network comprises a GPRS network and the broadband network comprises a DVB-T network.

40. The content server of claim 38, wherein the narrowband network comprises at least one of a Bluetooth and WLAN network.

41. The content server of claim 24, wherein the instructions further comprise the steps of:
 (iv) receiving speech input from a user;
 (v) recognizing the received speech; and
 (vi) converting the received speech into the request.

42. The content server of claim 24, wherein each content item is associated with a genre, and wherein the content server plays the first content item through an output device associated with the same genre as the first content item.

43. The content server of claim 24, wherein the computer readable instructions further comprise the step of sending an acknowledgement to the mobile terminal responsive to receiving the request.

44. The content server of claim 43, wherein the acknowledgement comprises an audio recording played through a speaker on the mobile terminal, and is presented in a style responsive to a user selected skin.

45. The content server of claim 24, wherein the mobile terminal comprises a mobile telephone.

46. A content delivery system, comprising:
 a short-range transceiver capable of interacting with mobile terminals within a service area served by the short-range transceiver; and
 a content server communicatively connectable to an audio delivery system separate from the mobile terminals and to said transceiver, comprising:
  a processor; and
  memory storing computer readable instructions that, when executed by the processor, cause the content server to perform the steps of:
   (i) sending a list of selectable musical compositions to a mobile terminal through the short-range transceiver;
   (ii) receiving a request from the mobile terminal through the transceiver, wherein the request corresponds to a user-selected musical composition from the list of selectable musical compositions;
   (iii) responsive to receiving the request, modifying a music playlist; and
   (iv) playing a first musical composition from the playlist through the audio delivery system.

47. The content delivery system of claim 46, wherein the playlist comprises an ordering of musical compositions according to a number of received requests for each musical composition.

48. The content delivery system of claim 46, wherein the playlist comprises an ordering of musical compositions according to a number of fulfilled requests associated with each of a plurality of users.

49. The content delivery system of claim 46, wherein the playlist comprises an ordering of musical compositions according to weights associated with each musical composition.

50. The content delivery system of claim 46, further comprising a display device communicatively coupled to the content server, wherein information associated with a presently playing musical composition is displayed on the display device.

51. The content delivery system of claim 46, wherein the request is a request not to play the user-selected musical composition, and the request has a negative effect on the user-selected musical composition's position in the playlist.

52. The content delivery system of claim 46, wherein the request is a guaranteed request, and wherein the computer readable instructions further comprise the steps of:
 (v) receiving an acknowledgement that a user associated with the mobile terminal has paid a fee in connection with submitting the guaranteed request; and
 (vi) storing the request on a guaranteed playlist, so that the requested musical composition will definitely be played.

53. The content delivery system of claim 52, wherein the computer readable instructions further comprise the step of playing musical compositions associated with requests stored on the guaranteed playlist before playing musical compositions not associated with requests stored on the guaranteed playlist.

54. The content delivery system of claim 46, wherein the computer readable instructions further comprise the step of sending an acknowledgement to the mobile terminal responsive to receiving the request.

55. The content delivery system of claim 46, wherein the audio delivery system and the transceiver are located within a restaurant.

56. A content server, comprising:
 a processor; and
 memory for storing computer readable instructions that, when executed by the processor, cause the content server to perform the steps of:

(i) receiving a request from a mobile terminal over a narrowband, bi-directional wireless network, wherein the request corresponds to a user-selected content item;
(ii) responsive to receiving the request, modifying a music playlist;
(iii) outputting a first content item from the playlist over a broadband, unidirectional network for playback.

57. The content server of claim 56, wherein the playlist comprises an ordering of content items according to a number of received requests for each content item.

58. The content server of claim 56, wherein the playlist comprises an ordering of content items according to weights associated with each content item.

59. The content server of claim 56, wherein the content item comprises music.

60. The content server of claim 56, wherein the request is a guaranteed request, and wherein the computer readable instructions further comprise the steps of:
(iv) receiving an acknowledgement that a user associated with the mobile terminal has paid a fee in connection with submitting the guaranteed request; and
(v) storing the request on a guaranteed playlist, so that the requested musical composition will definitely be played.

61. The content server of claim 56, wherein the mobile terminal comprises a mobile telephone.

62. The content server of claim 56, wherein the instructions further comprise the steps of:
(iv) receiving speech input from a user;
(v) recognizing the received speech; and
(vi) converting the received speech into the request.

63. The content server of claim 62, wherein the computer readable instructions further comprise the step of sending an audio acknowledgement to the mobile terminal responsive to receiving the request.

64. The content server of claim 63, wherein the audio acknowledgement is presented differently according to a user selected skin.

65. A mobile terminal, comprising:
a processor;
a display screen;
a plurality of user input buttons; and
memory storing computer readable instructions that, when executed by the processor, cause the mobile terminal to perform the steps of:
(i) displaying a list of user-selectable content items on the display screen;
(ii) navigating the list of user-selectable content items responsive to user-input through the user input buttons;
(iii) receiving input indicating a user-selected content item; and
(iv) sending information corresponding to the user-selected content item to a content server for playback through an output device separate from the mobile terminal,
wherein each content item comprises an audio recording.

66. The mobile terminal of claim 65, wherein the computer readable instructions further comprise the step of receiving the list of user-selectable content items from the content server.

67. The mobile terminal of claim 65, wherein the computer readable instructions further comprise the step of receiving an acknowledgement from the content server responsive to step (iv).

68. The mobile terminal of claim 65, wherein the computer readable instructions further comprise the steps of:

(v) sending information corresponding to a current item on the list of user-selectable content items;
(vi) receiving a sample of the current item from the content server; and
(vii) playing the sample through an output device on the mobile terminal.

69. The mobile terminal of claim 65, wherein step (iv) is performed over a narrowband, bid-directional network,
wherein the output device comprises a speaker on the mobile terminal, and
wherein the computer readable instructions further comprise the steps of:
(v) receiving content over a broadband, unidirectional network; and
(vi) playing the content through the speaker.

70. The mobile terminal of claim 69, wherein the broadband network comprises a DVB-T network, and the narrowband network comprises a GPRS network.

71. A computer readable medium storing computer readable instructions that, when executed by a processor, cause a data processing device to provide content delivery services by performing the steps of:
(i) a content server sending a list of selectable content items to a mobile terminal;
(ii) the content server receiving a request from the mobile terminal, wherein the request corresponds to a user-selected content item from the list of selectable content items; and
(iii) responsive to receiving the request, the content server playing a first content item through an output device separate from the mobile terminal.

72. The computer readable medium of claim 71, wherein the instructions further comprise the step of playing content items according to a playlist.

73. The computer readable medium of claim 72, wherein the instructions further comprise the step of ordering the playlist according to a predetermined algorithm.

74. The computer readable medium of claim 71, wherein the content comprises music and the output device comprises a speaker.

75. The computer readable medium of claim 71, wherein the computer readable instructions further comprise the step of sending a sample to the mobile terminal, wherein the sample comprises a portion of a user-selectable content item.

76. The computer readable medium of claim 71, wherein the request is a request not to play the user-selected content item, and further comprising the step of delaying playback of the user-selected content item responsive to receiving the request.

77. The computer readable medium of claim 71, wherein the request is a guaranteed request, and wherein the instructions further comprise the steps of:
(iv) the content server receiving an acknowledgement that a user associated with the mobile device has paid a fee in connection with submitting the guaranteed request; and
(v) requiring that the user-selected content item be played.

78. The computer readable medium of claim 71, wherein steps (i)-(ii) are performed over a narrowband network, and wherein step (iii) is performed over a broadband network.

79. The computer readable medium of claim 71, wherein the instructions further comprise the steps of:
(iv) receiving speech input from a user;
(v) recognizing the received speech; and
(vi) converting the received speech into the request.

80. A content server, comprising:

a processor; and memory for storing computer readable instructions that, when executed by the processor, cause the content server to perform the steps of:

(i) receiving an audio speech request from a mobile terminal over a narrowband, bi-directional network, wherein the audio speech request corresponds to a user-defined query for at least one content item;

(ii) performing the query on at least one content database;

(iii) responsive to the query's results, modifying a content playlist;

(iv) outputting a first content item from the playlist over a broadband, unidirectional network for playback.

81. The content server of claim 80, wherein the content comprises music.

82. The content server of claim 80, wherein the instructions further cause the content server to perform the steps of:

(i) recognizing the received audio speech; and (ii) converting the received audio speech into the query.

* * * * *